United States Patent Office 2,750,027
Patented June 12, 1956

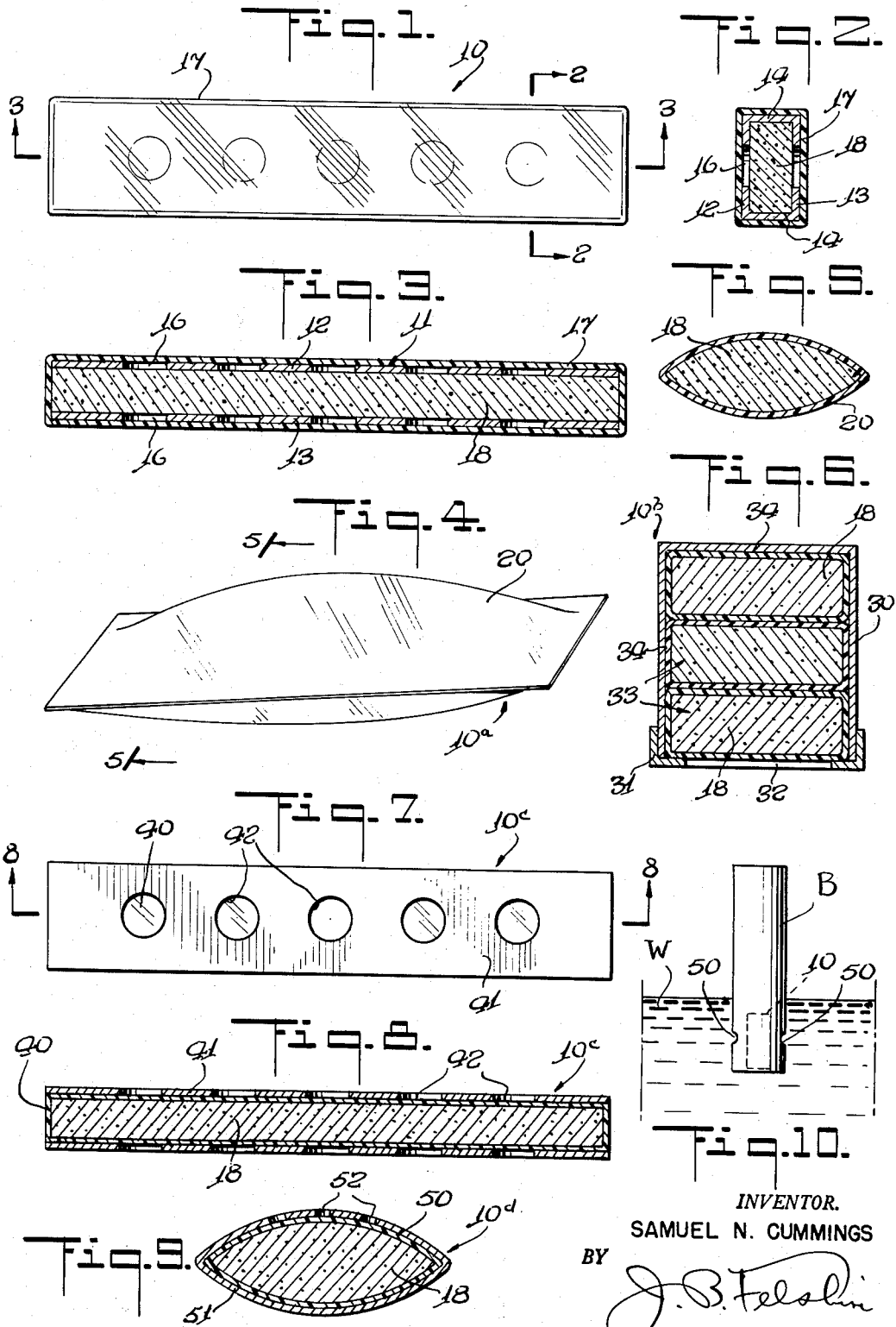

2,750,027

VISUAL INDICATING DEVICES FOR PRODUCING A COLOR SLICK OR PATCH AT SEA OR IN ANY WATERS

Samuel N. Cummings, Brooklyn, N. Y.; Molly Cummings, executrix of the estate of said Samuel N. Cummings, deceased Application August 21, 1951, Serial No. 242,848

6 Claims. (Cl. 206—.5)

This invention relates to visual indicating devices for producing a color slick or patch at sea or in any waters.

There is now known a device called "Sonobuoy." It is a buoy provided with means to produce sound and color to aid in the detection of floating or undersea objects or crafts. Such a device is usually dropped from a plane, surface or subsurface craft. It lands onto the water, bottom first and floats with its lower third submerged in the water. Two glass tubes of dye are attached to the bottom of the buoy. When the buoy strikes the surface of the water the two dye tubes are broken and the dye contained therein is scattered on the surface and dissolved, forming a color patch or slick which is easily distinguishable from the air. This color patch or slick is intended to make it easy to locate the "Sonobuoy" from the air.

This buoy also contains electronic means for locating the presence of subsurface craft and signalling said location to air or surface craft.

However, this method of producing a color slick at sea is not the most efficient for two reasons. First, the color slick disappears after a short time. Second, the buoy moves with the current or tide and drifts away from the color slick and is difficult to locate in a choppy sea.

To make the "Sonobuoy" more effective from the color standpoint it is necessary and desirable to have a continuous dye stream, patch or slick given off by the buoy during its period of operation, to facilitate locating the buoy from the air during its period of operation.

It has been suggested that a cake of dye be attached to the "Sonobuoy" so that as the buoy floats the dye will dissolve and leave a continuous trail or slick of color. Unfortunately, the instruments or devices used to eject, project, or release the "Sonobuoy" are such that it is not possible to attach anything externally to the body of the buoy. The dye should be incorporated in such a manner that the buoy will give off a continuous stream of color from the moment it hits the water, regardless of whether it stands still, floats or drifts. The stream of color should be of such a volume and intensity as to leave a definite color trail or wake easily recognizable from the air. The dye should be in such a form as to be easily incorporated into the buoy without soiling the worker's hands or clothing or presenting a health or industrial hazard. The design of the present "Sonobuoy" does not permit the utilization of larger dye tubes.

The outer wall lower end of "Sonobuoy" has holes in it to permit sea water to enter and exit in the lower third of the device. There is also space inside the lower third for additional dye. If sufficient dye is added inside the body to emit a continuous trail it will increase the efficiency of the buoy, since instead of the buoy floating away from the color slick or patch as it now does, it will give off a continuous color slick or patch. Perhaps it might be desirable to say it will be continuously in the immediate area of the color slick or patch. However, another difficulty is involved so that merely increasing the amount of dye will not solve the problem.

Presently the dye used in the "Sonobuoy" is Rhodamine B, Color index #749. This Rhodamine is only partially soluble in sea water. It has a tendency, when the concentration of dye is great, to precipitate out of sea water or salt water.

A problem stems from this fact that Rhodamine B is only partially soluble in a salt solution such as sea water. If a cake of Rhodamine or a container of Rhodamine powder were put into the buoy, water seeping into the buoy, contacting the outside of the Rhodamine dye, would cause the outer layer of dye to dissolve slowly, thereby starting a precipitation, forming a sludge. As the sludge is formed, it clogs up the openings through which the sea water reaches the dye. The result is then that no more dye is dissolved after the initial outer layer is dissolved. The sludge which forms, seals off the openings and prevents the sea water from reaching fresh dye. The sludge sticks to the dye and does not go off and no fresh or dry dye is presented to the water for solution. It is therefore an object of the present invention to provide a means to prevent the sludge from sealing the dye and to provide for the sludge breaking away so as to present a new surface of dye continuously, so that as the dye is dissolved it will break off and produce a continuous solution and hence a continuous slick. In accordance with the present invention I have combined the dye with a chemical which will produce carbon dioxide gas in the presence of sea water, which carbon dioxide gas pushes the sludge away from the dye to present new dye for solution, whereby to produce a continuous slick.

In accordance with one form of the present invention there is employed a cartridge formed with openings in which the dye mixed with sodium bicarbonate and tartaric acid is packed. The Rhodamine is mixed dry with the tartaric acid and bicarbonate of soda. The sea water acting on the sodium bicarbonate and tartaric acid produces carbon dioxide gas bubbles. As carbon dioxide bubbles are formed they force away the dissolved dye and new dry dye is presented to the sea water for solution. At the same time some more tartaric acid and bicarbonate of soda receives sea water to produce more bubbles of carbon dioxide to push out some more dissolved Rhodamine dye to continue forming the color slick. In other words, the agglomeration of dissolved Rhodamine dye is prevented by the continuous formation of the carbon dioxide gas.

Other dyes besides Rhodamine B may be employed. For example, a triphenylmethane dye such as auramine may be employed. Instead of tartaric acid, citric acid or malic acid may be used. Potassium bicarbonate may be used as well as sodium bicarbonate. Also, sodium bisulphite may be mixed with bicarbonate of soda to produce a gas.

I have found furthermore that it may be advisable to retard the production of the color slick and facilitate the handling of the dye. For this reason it is a further object of this invention to pack the powder in a film which is soluble in cold sea water. I have found a cold water soluble polyvinyl alcohol film such as made by Reynolds Metals Corp. under the trademark Reynolon 4000 series, to be suitable. The speed with which the water initially starts acting on the dye may be regulated by changing the thickness of the film. Furthermore, the film can be fabricated so as to permit handling the dye easily.

Yet a further object of this invention is to provide a highly improved color slick forming device to be used at sea, which shall be relatively inexpensive to manufacture, and which shall yet be practical and efficient to a high degree in use.

Other objects of this invention will in part be obvious and in part hereinafter pointed out.

The invention accordingly consists in the features of construction, combination of elements, compositions of matter, and arrangement of parts, which will be exemplified in the construction hereinafter described, and of which the scope of invention will be indicated in the following claims.

In the accompanying drawings in which are shown various illustrative embodiments of this invention, Fig. 1 shows a cartridge embodying the invention, which may be placed in a buoy to produce a color slick;

Fig. 2 shows a cross-sectional view taken on line 2—2 of Fig. 1;

Fig. 3 shows a cross-sectional view taken on line 3—3 of Fig. 1;

Fig. 4 is a perspective view of another form of the invention;

Fig. 5 is a cross-sectional view taken on line 5—5 of Fig. 4;

Fig. 6 is a longitudinal cross-sectional view illustrating another form of the invention;

Fig. 7 is a top plan view of a device embodying the invention and illustrating a modification;

Fig. 8 is a cross-sectional view taken on line 8—8 of Fig. 7;

Fig. 9 is a transverse cross-sectional view illustrating yet another form of the invention; and Fig. 10 is a side elevational view of a buoy carrying a slick forming device embodying the invention.

Referring now in detail to the drawing, and particularly to Figs. 1, 2 and 3, numeral 10 designates a cartridge which may be placed in a "Sonobuoy" or other buoy, or which may be attached to a boat or raft adrift, to produce a color slick in sea water. The cartridge 10 comprises a tubular member 11 which may be made of synthetic plastic material, cardboard, metal, or any other water non-soluble material. The tube 11 comprises a top wall 12, a bottom wall 13, and side walls 14. The tube may be open at its ends. The top and bottom walls 12 and 13 are each formed with a series of openings 16. The tube may be covered by a wrapper 17 of a polyvinyl alcohol film which is soluble in cold sea water. It has been found that the polyvinyl alcohol film manufactured by the Reynolds Metals Corp. is suitable.

Within the tube 11 is a mixture 18 of Rhodamine B dye, tartaric acid and sodium bicarbonate. When the cartridge 10 is dropped at sea, the wrapper 17 will first dissolve exposing the ends of the tube 11 and the openings 16. Sea water will thus reach the mixture 18. The Rhodamine dye being contacted by sea water will dissolve to form a color slick.

If Rhodamine were used alone a sludge would form at the openings 16 and at the ends of the tube. This sludge would seal off the openings and cause an agglomeration which would prevent fresh Rhodamine from being presented to the water, and the solution of the dye would thus stop. However, the sea water coming in contact with the tartaric acid and sodium bicarbonate causes a reaction producing carbon dioxide gas. The bubbles of gas serve to push away the sludge of dissolved dye which is formed, thereby presenting fresh dye to the sea water. As the fresh dye is dissolved, more tartaric acid and sodium bicarbonate react to produce more carbon dioxide gas to push away the newly formed sludge. Thus a continuous stream of dissolved dye is produced to produce a continuous color slick. If the cartridge 10 is in a buoy which floats or drifts with the tide, a continuous slick will be formed extending from the buoy, so that the buoy can be located from the air, as by an airplane locating the color slick.

One use of the cartridge 10 may be in connection with a "Sonobuoy" or other buoy B (Fig. 10) which may be dropped by a patrol plane when the pilot sees a suspicious wake at sea. The buoy drops to the sea and the lower third thereof is submerged. The cartridge 10 may be inserted into the lower end of the buoy. The outer shell of the buoy has openings so that sea water may seep in and out of the buoy, coming in contact with the openings in the cartridge. However, the patrol plane may be travelling very fast and by the time the plane turns around it may be many miles away so that the pilot would have to look for the color slick.

The buoy does not have a large diameter and may be submerged in a choppy sea, but by the production of a slick which may be 30 ft. or even more in width, there is an aid to visual location of the buoy, which may be better than sound.

The present "Sonobuoys" are ineffective as far as the color end goes because the buoy may float away from the slick, which would not occur by the use of the present cartridge 10 in such a buoy. The buoy may also have means for picking up sound from an undersea craft and for sending signals to a plane when dropped at sea. Such buoys are now used, but with the present device 10 the color slick does not separate from the buoy.

With the use of the device 10 to produce a color slick, the buoy may be located even before any sound signals come from the buoy.

The following dyes may be used:

*Rhodamine B.*—Color index #749: Xanthene coloring matter (group). Hydrochloride of diethyl-m-aminophenol-phenol-phthalein or tetraethyl di amino-o-carboxy-phenyl-xanthenyl chloride.

*Rhodamine GG.*—Color index #752: Xanthene coloring matter (group). Ethyl-ester of diethyl diamino-o-carboxy-phenyl-xanthenyl chloride.

*Auramine O.*—Color index #655: Ketonimine coloring matter (group). Hydrochloride of tetra methyl-diamino-diphenyl-ketonimine.

*Triphenylmethane* and diphenyl napthyl methane coloring matter (group).

*Methyl Violet 2B.*—Color index #680: Hydrochloride of penta methyl para rosaniline.

*Dis-azo.*—Coloring matter (group): Bismarck Brown R—Color index #332: Hydrochloride of toluene—2.4 disazo-bis-m-toluylene diamine.

*Azine.*—Coloring matter (group): Saframine T Cone—Color index #841: Mixture of diamino-phenyl-ditolazonium chloride and diamino-o-tolyl-ditolazonium chloride.

The following chemicals for making carbon dioxide gas may be used:

*Dibasic acids:* Tartaric acid, dihydroxysuccinic acid. $HO_2CCHOHCHOHCO_2H$.

*Polybasic acid:* Citric acid, hydroxy tricarballylic acid. $(HO_2CCH_2)_2C(OH)CO_2H$.

*Potassium alum:* $Al_2(SO_4)_3K_2SO_4 \cdot 24H_2O$ and bicarbonate of soda to give the $CO_2$.

Furthermore, a mixture of sodium bisulphite and bicarbonate of soda may be mixed with the dye to produce gas for breaking away the dissolved outer surface of the dye. The amount of tartaric acid and bicarbonate of soda will determine the speed of solution. A ratio of 3 dye to 1 compound gives good results. A ratio of 1 to 1 would speed up the solution of the dye, whereas a ratio of 7 to 1 would slow it down.

The wrapping of the cartridge with film provides for ease of handling. By regulating the thickness of the film, the speed with which it is desired to have the water initially start acting on the dye may be controlled. A .003" thickness of film will dissolve in sea water in about a minute or two, whereas a .012" thickness of film (which may be made up in layers of thinner film) may take about 10 minutes to dissolve.

In Figs. 4 and 5 there is shown a package 10a embodying another form of the invention. The same comprises an outer wrapper 20 of water soluble film such as polyvinyl alcohol manufactured by Reynolds Metals Corp. The wrapper or envelope 20 may contain the mixture 18. The mixture 18 may be in the form of a cake instead of powder.

In Fig. 6 there is shown a device 10b embodying the invention and illustrating another modified construction. The device 10b comprises an outer container 30 of plastic, metal, wood, cardboard, or any other water non-soluble material. The container 30 is open at one end, and the opening may be closed by a cover 31 which in turn may have an opening 32. Within the container 30 are a series of packages 33. Each package 33 comprises an outer wrapper 34 of polyvinyl alcohol wrapped around or containing the mixture 18. With the device 10b, delayed solution of the dye may be obtained. Thus as sea water passes through the opening 32 and dissolves the wrapper 34 in the lowermost package 33, the dye in said package will first dissolve. After it is fully dissolved, then the water must dissolve the next wrapper before the next package goes gradually into solution. Thus instead of the dye lasting for hours it may be caused to last for a day or more.

In Figs. 7 and 8 there is shown a device 10c embodying the invention, similar to device 10, with the exception that the powder 18 in the tube is wrapped with an inner wrapper 40 of polyvinyl alcohol cold water film disposed within an outer cartridge 41. The cartridge 41 may be tubular in shape and may be provided with openings 42 through which the sea water may reach the inside of the cartridge. Thus the sea water passing through the openings 42 would first dissolve portions of the wrapper 40 before it reaches the dye.

In Fig. 9 there is shown a device 10d embodying the invention and illustrating yet another modified construction. The device 10d comprises an inner envelope or wrapper 50 of polyvinyl alcohol containing the mixture 18. However, the wrapper 50 may be enclosed in an outer wrapper 51 of non-water soluble material and provided with openings 52. The outer wrapper 51 may be soft or flexible. With the use of the devices 10d and 10a the packages may be pushed into odd shaped spaces in a buoy or in any other device.

There has thus been provided a device which will prevent the dye from agglomerating. The devices disclosed herein present the dye to the sea water in such minute quantities that it will dissolve in a steady stream with the formation of bubbles of gas pushing away dissolved surfaces of the dye and presenting new surfaces of the dye to be acted upon by the water.

In Fig. 10 is shown a buoy B floating in sea water W with a lower part of the buoy submerged. In the lower part of the buoy B is a slick forming device such as device 10. The buoy B has openings 50 so that sea water can come into contact with the device 10. It will be understood that the devices 10a, 10b, 10c or 10d can be substituted for device 10.

It will thus be seen that there is provided a device and composition in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A visual indicating package for producing a color slick upon contact with water comprising a container of water non-soluble material having one or more openings, a mixture within the container of a dye soluble in water but tending to clog said openings and chemicals reacting in the presence of water to generate carbon dioxide, the latter forcing said dye thru said openings.

2. The combination of claim 1, and an outer wrapper of water-soluble film encasing said container and closing said openings.

3. The combination of claim 1, and an outer wrapper of polyvinyl alcohol film encasing said container and closing said openings.

4. A visual indicating package for producing a color slick upon contact with water comprising a sealed wrapper of water-soluble material, a mixture within said wrapper of dye soluble in water and chemicals reacting in the presence of water to generate carbon dioxide, an outer container of water non-soluble material for said sealed wrapper, said container having one or more openings, said dye having a tendency to clog said openings and the carbon dioxide to force the dye through said openings.

5. A visual indicating package for producing a color slick upon contact with water comprising a mixture of an organic dye soluble in water but tending to form a scum upon contact with water and chemicals reacting with water to generate carbon dioxide, and a container therefor, said container being formed of water non-soluble material and having one or more openings therethrough.

6. A visual indicating package for producing a color slick upon contact with water comprising a mixture of an organic dye and carbon dioxide-generating chemicals, said dye being a member chosen from the group consisting of Rhodamines and auromine, and said chemicals being a member chosen from the group consisting of alkali and alkali earth carbonates and bicarbonates and a member chosen from the group consisting of aliphatic dibasic and tribasic acids, and a container for said mixture of dye and gas-generating chemicals, said container being formed of water non-soluble material and having one or more openings therethrough.

References Cited in the file of this patent

UNITED STATES PATENTS

| | | |
|---|---|---|
| 2,251,080 | Taber | July 29, 1941 |
| 2,320,282 | Kamlet | May 25, 1943 |
| 2,331,955 | Beebe et al. | Oct. 19, 1943 |
| 2,387,244 | Compton et al. | Oct. 23, 1945 |
| 2,418,033 | Kamlet | Mar. 25, 1947 |
| 2,418,392 | Bender | Apr. 1, 1947 |
| 2,418,397 | Collyer et al. | Apr. 1, 1947 |
| 2,420,286 | Lacey et al. | May 6, 1947 |
| 2,459,267 | Dwyer et al. | Jan. 18, 1949 |
| 2,509,943 | Silvey | May 30, 1950 |
| 2,572,669 | Sarge | Oct. 23, 1951 |